(12) United States Patent
Sawatari et al.

(10) Patent No.: US 7,553,521 B2
(45) Date of Patent: *Jun. 30, 2009

(54) LIQUID CRYSTAL DISPLAYS

(75) Inventors: Naoko Sawatari, Tokyo (JP); Masato Okabe, Tokyo (JP); Hideo Hama, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 459 days.

This patent is subject to a terminal disclaimer.

(21) Appl. No.: 11/039,278

(22) Filed: Jan. 19, 2005

(65) Prior Publication Data

US 2005/0233094 A1    Oct. 20, 2005

(30) Foreign Application Priority Data

Jan. 22, 2004    (JP)    ............................. 2004-014976

(51) Int. Cl.
*C09K 19/02*    (2006.01)
*G02F 1/141*    (2006.01)

(52) U.S. Cl. ......................... 428/1.1; 428/1.2; 349/124; 349/135

(58) Field of Classification Search ........... 428/1.1–1.2; 349/123–124, 135; 252/299.4, 299.68, 299.01; 345/88–89

See application file for complete search history.

(56) References Cited

U.S. PATENT DOCUMENTS

| 5,977,942 | A | * | 11/1999 | Walker et al. ................. 345/97 |
| 6,001,277 | A | * | 12/1999 | Ichimura et al. ......... 252/299.4 |
| 6,107,427 | A | * | 8/2000 | Herr et al. .................... 526/321 |
| 6,153,272 | A | * | 11/2000 | Kim et al. ..................... 428/1.5 |
| 6,160,597 | A | * | 12/2000 | Schadt et al. ................. 349/98 |
| 6,201,087 | B1 | * | 3/2001 | Herr et al. .................... 526/268 |
| 2002/0085153 | A1 | | 7/2002 | Choi et al. |
| 2002/0187282 | A1 | * | 12/2002 | Farrand et al. ............... 428/1.1 |
| 2003/0058210 | A1 | * | 3/2003 | Yamazaki et al. ............. 345/89 |
| 2003/0127627 | A1 | * | 7/2003 | Amakawa et al. ...... 252/299.01 |
| 2003/0232930 | A1 | * | 12/2003 | Gibbons et al. ............. 525/418 |

FOREIGN PATENT DOCUMENTS

| GB | WO 00/55151 | * | 9/2000 |
| JP | 2003-005223 | | 1/2003 |

OTHER PUBLICATIONS

Nonaka, T., Li, J., Ogawa, A., Hornung, B., Schmidt, W., Wingen, R., and Dubal, H., 1999, Liq. Cryst., 26, 1599., Fig 4.
Patel, J., and Goodby, L.W., 1986, J. Appl. Phys., 59,2355.

* cited by examiner

*Primary Examiner*—Keith D Hendricks
*Assistant Examiner*—Sophie Hon
(74) *Attorney, Agent, or Firm*—Ladas & Parry, LLP

(57) ABSTRACT

The invention provides a liquid crystal displays using a ferroelectric liquid crystal, which can give mono-domain alignment of ferroelectrical liquid crystal without forming orientation defects and which is so remarkably good in orientation stability that the orientation thereof can be maintained even if the temperature of the liquid crystal is raised to the phase transition point or higher.

The invention provides liquid crystal displays comprising a ferroelectric liquid crystal sandwiched between two substrates, wherein an electrode and a photo alignment film are each successively formed, the first of which is a photoreactive material which generates photoreaction to give anisotropy to the photo alignment film, and the constituent material of the second film is an optically isomerizable material comprising an optically isomerization-reactive compound.

12 Claims, 4 Drawing Sheets

FIG. 3
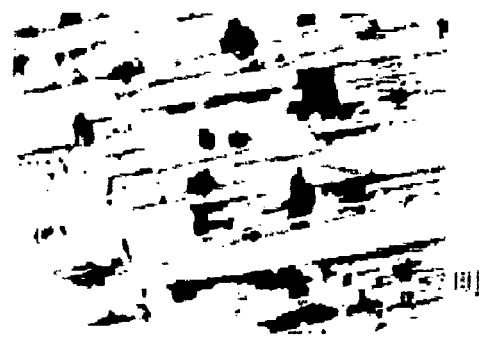
BRIGHT
DARK

LIQUID CRYSTAL DISPLAYS

BACKGROUND OF THE INVENTION

1. Field of the Invention

The present invention relates to liquid crystal displays using ferroelectric liquid crystal, more specifically, liquid crystal displays in which a photo alignment film is used to control the orientation of ferroelectric liquid crystal.

2. Description of the Related Art

Since liquid crystal displays have features that it is thin and is low in power consumption and other features, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and other shave been developed and made practicable. However, nematic liquid crystal is used therein; therefore, the response speed of the liquid crystal material is as small as several milliseconds to several tens of milliseconds and it cannot be said that these sufficiently cope with display of moving images.

Ferroelectric liquid crystal (FLC) exhibits a very short response time in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 1). However, the liquid crystal has a problem that the liquid crystal has memory property but graduation display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain graduation display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599., FIG. 1). As such liquid crystal exhibiting mono-stability, there is usually used a ferroelectric liquid crystal in which phase change is caused between chorestric phase (Ch) and chiral smectic C phase (SmC*) via no smectic A phase (SmA). When ferroelectric liquid crystal exhibits mono-stability in this manner, the liquid crystal does not have any memory property and it is desired to drive the liquid crystal through an active matrix system in which an active element such as a transistor or a diode is added to each pixel. In the case of using, in particular, an active matrix system using TFT elements as active elements, high-quality display can be attained since target pixels can be certainly switched on and off.

In the mean time, ferroelectric liquid crystal has a higher order of molecules therein than nematic liquid crystal; therefore, the former liquid crystal is not easily oriented so that defects called zigzag defects or hairpin defects are easily generated. Such defects cause a fall in contrast based on light leakage. In particular, ferroelectric liquid crystal undergoing phase transition via no SmA phase generates two domains different in the layer normal-line direction thereof (hereinafter referred to as "double domains") (FIG. 2). The double domains give such display that black and white are reversed so as to cause a serious problem (FIG. 3). As the method for removing the double domains, known is an electric field induced technique (, which uses DC voltage during cooling process) of heating a liquid crystal cell to a temperature not lower than the Ch phase thereof, and then cooling the liquid crystal cell slowly while applying a DC voltage thereto (PATEL, J., and GOODBY, J. W., 1986, J. Appl. Phys., 59, 2355). This method has problems that the orientation of the liquid crystal is disturbed when the temperature thereof is again raised to a temperature not lower than the phase transition temperature thereof and the orientation is disturbed in regions where no electric field acts between pixel electrodes, and other problems.

As the technique for subjecting liquid crystal to orienting treatment, there is known a method of using an orientation film. The method is classified into the rubbing method and the optical orienting method. The rubbing method is a method of subjecting a substrate coated with a polyimide film to rubbing treatment to orient chains of the polyimide polymer in the direction of the rubbing, thereby orienting liquid crystal molecules on the film. The rubbing method is excellent in controllability of the orientation of nematic liquid crystal, and is generally an industrially applicable technique. However, this method has the following problems: the generation of static electricity and dust, unevenness in the power for regulating the orientation and the tilt angle of liquid crystal, treatment-ununiformity caused when a large area is treated, and soon. Thus, this method is unsuitable as a method for orienting ferroelectric liquid crystal, in which orientation defects are easily generated. Moreover, the rubbing method cannot overcome double domains.

The above-mentioned optical orienting method is a non-contact orienting method instead of the rubbing method. The optical orienting method is a method of radiating light the polarization of which is controlled onto a substrate coated with a polymer film or a monomolecular film to generate photo-excited reaction (decomposition, isomerization or dimerization) so as to give anisotropy to the polymer film or the monomolecular film, thereby orienting the liquid crystal molecules on the film. This method is useful since the generation of static electricity or dust, which is a problem in the rubbing method, does not arise and the orientating treatment can be quantitatively controlled. However, even if this method is used, it is difficult to suppress the generation of double domains and obtain mono-domain alignment.

Another method for making ferroelectric liquid crystal monostable is the polymer stabilization method. The polymer stabilization method is a method of injecting a ferroelectric liquid crystal blended with an ultraviolet curable monomer into a liquid crystal cell subjected to orienting treatment, and then radiating ultraviolet rays onto the liquid crystal in the state that an AC or DC voltage is applied thereto, thereby polymerizing the monomer to stabilize the liquid crystal. However, the method has problems that the production process thereof is complicated and the voltage for driving the liquid crystal is high.

As still another method for giving mono-domains, Japanese Patent Application Laid-Open (JP-A) No. 2003-5223 describes a method of subjecting one out of orienting-films on and beneath a ferroelectric liquid crystal to rubbing treatment, and subjecting the other to optical orienting treatment, thereby orienting the ferroelectric liquid crystal. However, according to this method, there remain problems such as the generation of static electricity or dust and treatment-ununiformity generated when a large area is treated, as described above, since only one of the films is rubbed.

In recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs. However, the field sequential color system is a system in which each pixel is subjected to time sharing; it is therefore necessary for the liquid crystal as the black and white shutter to have high-speed responsiveness in order to give a good moving image display property. If ferroelectric liquid crystal is used, this problem can be solved. However, the ferroelectric liquid crystal has a problem that orientation defects are easily generated, as described above, and thus the color system using this liquid crystal has not been made practicable.

SUMMARY OF THE INVENTION

A main object of the present invention is to provide liquid crystal displays, using a ferroelectric liquid crystal, which can give mono-domain alignment of the ferroelectric liquid crystal without forming orientation defects such as double domains and which are so remarkably good in orientation stability that the orientation thereof can be maintained even if the temperature of the liquid crystal is raised to the phase transition point or higher.

In light of the above-mentioned situation, the inventors have made eager investigation so as to find out that a photo alignment film is formed on each of opposite faces of two substrates and materials having different compositions are used as the materials of the upper and lower photo alignment films, whereby the mono-domain alignment of a ferroelectric liquid crystal therebetween can be obtained in the state that orientation defects such as double domains are restrained from being generated. Thus, the present invention has been made.

Accordingly, the present invention provides liquid crystal displays comprising a ferroelectric liquid crystal sandwiched between two substrates in which an electrode and a photo alignment film are each successively formed on inner sides of the substrates facing each other, a constituent material of a first orientation film out of the two photo alignment films is a photoreactive material which generates photoreaction to give anisotropy to the photo alignment film, and the constituent material of a second photo alignment film is an optically isomerizable material comprising an optically isomerization-reactive compound which generates an optical isomerization reaction to give anisotropy to the photo alignment film.

The present invention has a photo alignment film on each of opposite faces of upper and lower substrates wherein: the constituent material of the first orientation film is a photoreactive material which generates photoreaction to give anisotropy to the photo alignment film; the constituent material of the second photo alignment film is an optically isomerizable material comprising an optically isomerization-reactive compound which generates optical isomerization reaction to give anisotropy to the photo alignment film; these materials of the photo alignment films are materials having different composition; and the photo alignment films are formed to sandwich a ferroelectric liquid crystal. By this structure, the present invention produces an effect that the ferroelectric liquid crystal can be orientated without forming orientation defects such as double domains. Since the present invention is liquid crystal displays in which the photo alignment films are used to conduct orienting treatment without depending on the electric field induced technique (, which uses DC voltage during cooling process), the invention has an advantage that even if the temperature thereof is raised to the phase transition point thereof or higher, the orientation of the liquid crystal can be maintained so as to restrain orientation defects such as double domains from being generated.

The photoreaction is preferably an optical dimerization reaction or a photo decomposition reaction since the use of the photoreaction causes anisotropy to be easily given to the photo alignment film.

The photoreactive material preferably comprises an optically dimerization-reactive compound having a radical-polymerizable functional group and dichroism that different absorptivities are exhibited in accordance with a polarization direction thereof since anisotropy can easily be given to the photo alignment film by radical-polymerizing its reactive sites oriented in the polarization direction.

The optically dimerization-reactive compound is preferably a dimerization-reactive polymer containing, as its side chain, any one of cinnamicacid ester, coumalin, and quinoline since anisotropy can easily be given to the photo alignment film by the radical polymerization in the state that the double bonds in the $\alpha$, $\beta$-unsaturated ketone oriented in parallel to the polarization direction function as reactive sites.

The optically dimerization-reactive compound is preferably at least one selected from dimerization-reactive polymers represented by the following formulae:

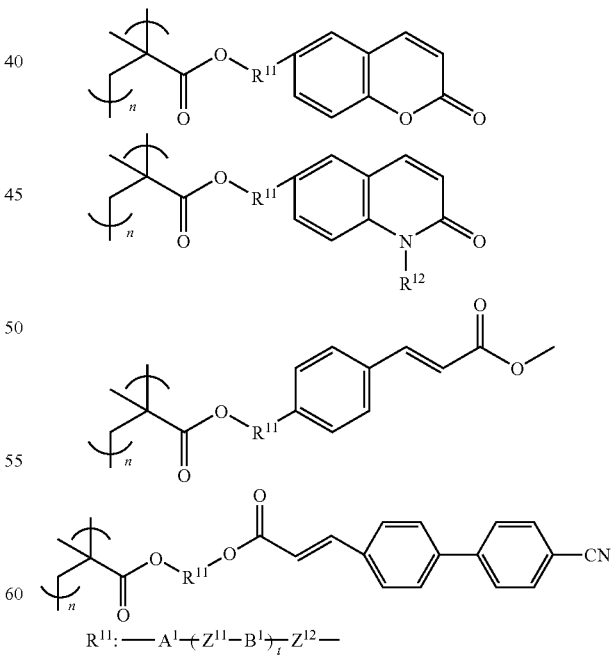

wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond; and t: an integer of 0 to 4.

$R^{12}$: a lower alkyl n: an integer of 4 to 30,000

This is because the dimerization-reactive polymer is small in energy necessary for the reaction thereof and functional groups suitable for the moieties $R^{11}$ and $R^{12}$ can be selected.

The optically isomerization-reactive compound is preferably a compound which has dichroism that different absorptivities are exhibited in accordance with a polarization direction thereof and further generates the optical isomerization reaction by an irradiation thereof with light since anisotropy can easily be given to the photo alignment film by causing the isomerization of its reactive sites oriented in the polarization direction of the optically isomerization-reactive compound having such properties.

For the optically isomerization-reactive compound, the optical isomerization reaction is preferably a cis-trans isomerization reaction since any one of a cis-isomer and a trans-isomer increases by the irradiation thereof with light, whereby anisotropy can be given to the photo alignment film.

The optically isomerization-reactive compound is preferably a compound having, in a molecule thereof, an azobenzene skeleton for the following reason: any azobenzene skeleton is subjected to the cis-trans isomerization reaction by the irradiation thereof with light; therefore, when the compound having, in the molecule thereof, an azobenzene skeleton is contained as the constituent material of the photo alignment film, anisotropy can easily be given to the photo alignment film. This is also for the following reason: when the compound has the azobenzene skeleton, the anisotropy given to the photo alignment film is particularly suitable for controlling the orientation of the ferroelectric liquid crystal.

The optically isomerization-reactive compound is a polymerizable monomer having, as its side chain, an azobenzene skeleton since anisotropy can easily be given to the photo alignment film and the anisotropy can be made stable when the polymerizable monomer having, as its side chain, an azobenzene skeleton contained as the constituent material of the photo alignment film.

The ferroelectric liquid crystal is preferably a ferroelectric liquid crystal that exhibits mono-stability since the advantageous effects resulting from the structure of the present invention becomes remarkable by using the ferroelectric liquid crystal which exhibits mono-stability as the ferroelectric liquid crystal.

The ferroelectric liquid crystal is preferably a ferroelectric liquid crystal having, in a phase series thereof, no smectic A phase. As described above, the ferroelectric liquid crystal having, in the phase series thereof, no smectic A phase easily generates orientation defects such as double domains. However, when the compositions of the upper and lower photo alignment films, which sandwich the ferroelectric liquid crystal, are made different from each other, orientation defects such as double domains can be restrained from being generated so that the advantageous effects resulting from the structure of the present invention become remarkable.

The ferroelectric liquid crystal is preferably a ferroelectric liquid crystal which constitutes a single phase. In the liquid crystal displays of the invention, a good orientation can be obtained even if the single-phase ferroelectric liquid crystal is used. Therefore, in order to control the orientation, it is unnecessary to use the polymer stabilization method or the like. Thus, the invention has advantages that the process for the production of the display element becomes simple and the driving voltage thereof can be made low.

The liquid crystal displays are preferably an element driven by an active matrix system using thin film transistors (TFTs) since the adoption of the active matrix system using TFT elements makes it possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, form a micro color filter in which TFT elements are arranged in a matrix form between the common electrode of the common electrode substrate and the substrate thereof, and use the resultant as color liquid crystal displays.

The liquid crystal displays are preferably elements driven by a field sequential color system for the following reason: the liquid crystal displays have a large response speed and makes it possible to orient the ferroelectric liquid crystal therein without forming any orientation defect; therefore, when the display element is driven by the field sequential color system, bright and highly precise display of color moving images which has a wide field angle can be realized at low costs and low power consumption.

The liquid crystal displays of the invention are useful since the elements make it possible to orient the ferroelectric liquid crystal therein without forming orientation defects such as zigzag defects, hairpin defects or double domains and further the elements are liquid crystal displays so remarkably good in orientation stability that the orientation is not easily disturbed even if the temperature thereof is raised to the phase transition point thereof or higher.

BRIEF DESCRIPTION OF THE DRAWINGS

FIG. 3 is a photograph showing double domains which are orientation defects of ferroelectric liquid crystal.

DESCRIPTION OF THE PREFERRED EMBODIMENTS

The liquid crystal displays of the present invention will be described in detail hereinafter. The liquid crystal displays of the invention are liquid crystal displays comprising a ferroelectric liquid crystal sandwiched between two substrates in which an electrode and a photo alignment film are successively formed on each of opposite faces of the substrates, and the constituent materials of the photo alignment films have compositions different from each other so as to sandwich the ferroelectric liquid crystal.

Figure 1:
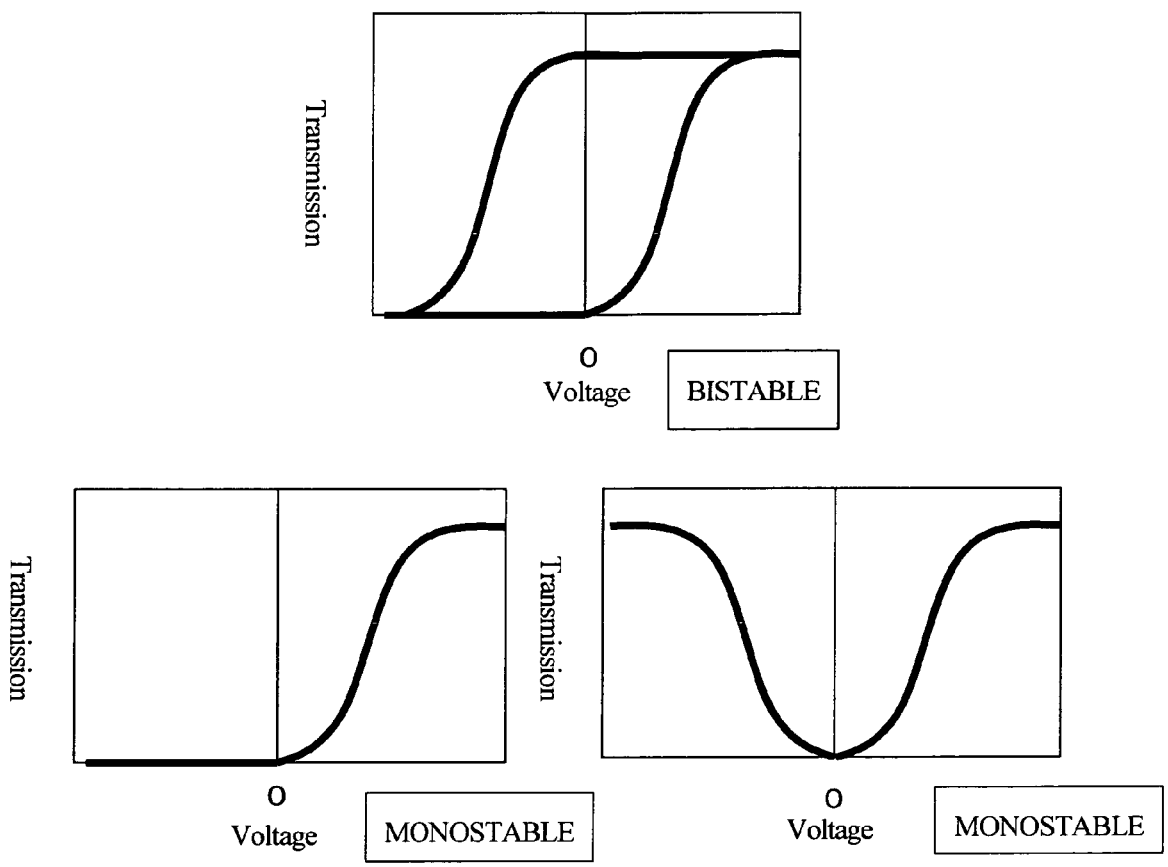
FIG. 1 is a graph showing changes in transmission as a function of voltage applied to ferroelectric liquid crystals.
Figure 2:
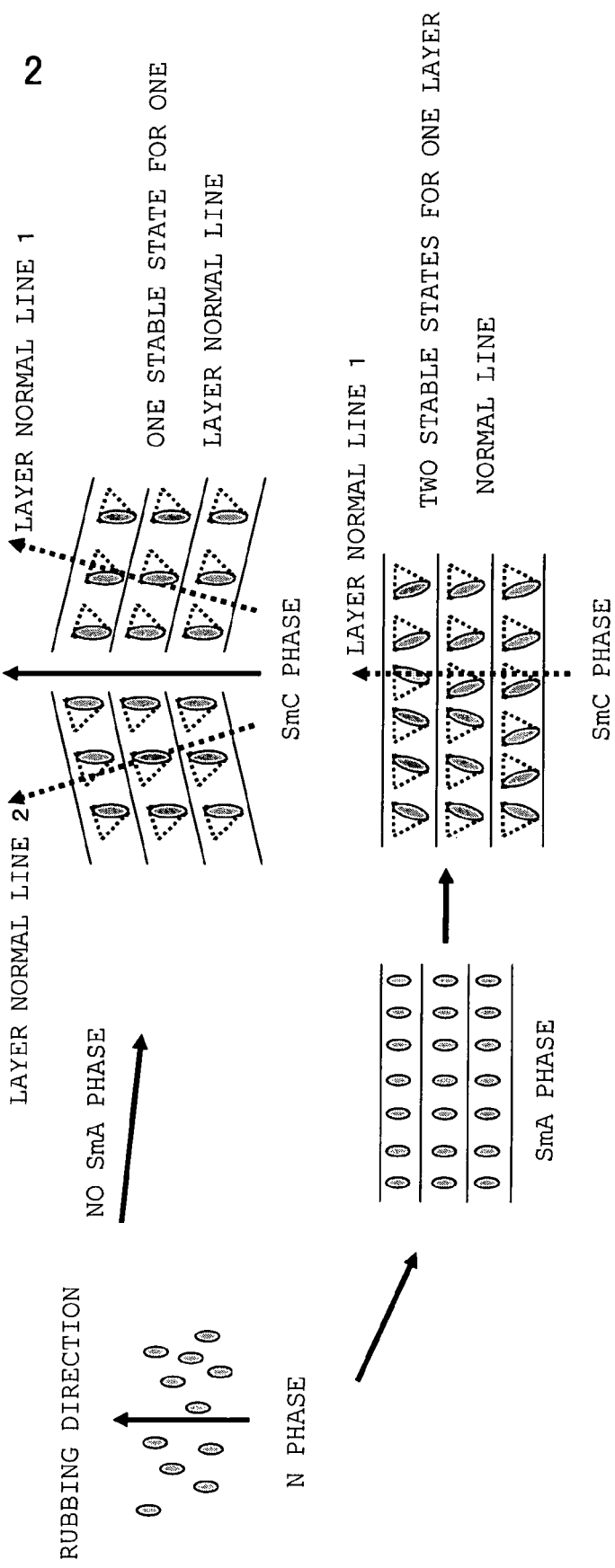
FIG. 2 is a view illustrating a difference of orientation defects based on a difference of the phase series that ferroelectric liquid crystal has.
Figure 4:
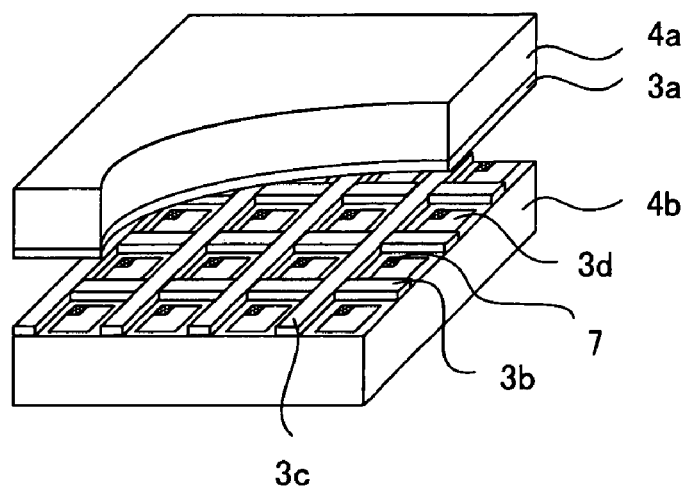
FIG. 4 is a schematic perspective view illustrating one example of the liquid crystal displays of the present invention.
Figure 5:
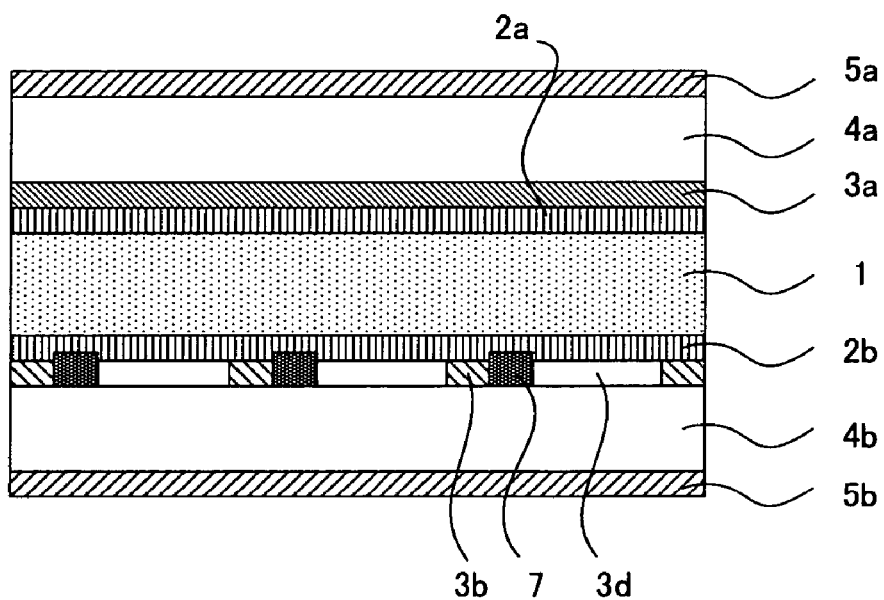
FIG. 5 is a schematic sectional view illustrating the example of the liquid crystal displays of the present invention.

The liquid crystal displays of the invention will be described with reference to the drawings. FIG. 4 is a schematic perspective view illustrating one example of the liquid crystal displays of the present invention. FIG. 5 is a schematic sectional view thereof. As shown in FIGS. 4 and 5, a common electrode 3a is formed on a substrate 4, and x electrodes 3b, y electrodes 3c and pixel electrodes 3d are formed on an opposite substrate 4b. Inside an electrode layer that these electrodes constitute are formed photo alignment films 2a and 2b. A ferroelectric liquid crystal is sandwiched between the photo alignment films 2a and 2b to constitute a liquid crystal layer 1. In FIG. 4, the illustration of photo alignment films 2a and 2b is omitted.

Polarizing plates 5a and 5b may be formed outside of the substrates 4a and 4b. This makes it possible to convert incident light into linear polarized light so that the display element can transmit only light polarized in the orientation direction of molecules of the liquid crystal. The polarizing plates 5a and 5b are arranged in such a manner that the polarization direction thereof is twisted at 90°. This makes it possible to control the direction of the optical axis of the liquid crystal molecules or the magnitude of the birefringence of the liquid crystal molecules between states that voltage is not applied thereto and is applied thereto, and produce a bright state and a dark state by use of the ferroelectric liquid crystal molecules as a black and white shutter. For example, in the state that no voltage is applied, the light transmitted through the polarizing plate 5a cannot be caused to rotate its polarization direction at an angle of 90° by setting the polarizing plate 5a to make consistent with the orientation of the liquid crystal molecules. Consequently, this light is blocked by the polarizing plate 5b so that the liquid crystal is turned into a dark state. On the other hand, in the state that voltage is applied, the direction of the liquid crystal molecules are changed by the voltage so that the optical axis thereof rotates by an angle θ from the initial state, whereby the polarization direction of the light is twisted at 90°. As a result, the light is transmitted through the polarizing plate 5b so that the liquid crystal is turned into a bright state. When the quantity of the transmitted light is controlled in accordance with the applied voltage, graduation display can be attained.

The liquid crystal displays of the invention have a photo alignment film on each of opposite faces of upper and lower substrates and the photo alignment films are made of materials different from each other to sandwich a ferroelectric liquid crystal as described above, thereby making it possible to restrain the generation of orientation defects such as zigzag defects, hairpin defects and double domains and yield the mono-domain alignment of the ferroelectric liquid crystal. The present invention causes the ferroelectric liquid crystal to be oriented without using the electric field induced technique (, which uses DC voltage during cooling process); therefore, the invention has advantages that orientation disturbance, which is based on a rise in the temperature of the liquid crystal up to not lower than the phase transition point thereof and is a problem of the electric field induced technique (, which uses DC voltage during cooling process), is not easily generated so that the invention is excellent in orientation stability. The reason why the use of materials different in composition, as the constituent materials of the photo alignment films, gives a good orientation state is unclear, but would be based on the difference of the interaction between the upper photo alignment film and the ferroelectric liquid crystal from the interaction between the lower photo alignment film and the ferroelectric liquid crystal. Since a ferroelectric liquid crystal is used as a black and white shutter in the liquid crystal displays of the invention as described above, the display element has an advantage that the response speed thereof can be made large.

As shown in, for example, FIG. 4, the liquid crystal displays of the present invention are preferably a display element in which one of the substrates is rendered a TFT substrate in which thin film transistors (TFTs) 7 are arranged in a matrix form, the other substrate is rendered a common electrode substrate having the common electrode 3a formed on the whole area thereof and the two substrates are combined with each other. Such liquid crystal displays of an active matrix system using TFT elements will be described hereinafter.

In FIG. 4, in one of the substrates, its electrode is the common electrode 3a, and thus the substrate is a common electrode substrate. On the other hand, in the opposite substrate, its electrodes are composed of the x electrodes 3b, the y electrodes 3c and the pixel electrodes 3d, and thus the substrate is a TFT substrate. In this liquid crystal displays, the electrodes 3b and the y electrodes 3c are arranged lengthwise and crosswise, respectively. When signals are added to these electrodes, the TFT elements 7 are worked so as to drive the ferroelectric liquid crystal. Regions where the x electrodes 3b and the y electrodes 3c cross are insulated with an insulator layer, which is not illustrated. Signals to the x electrodes 3b and signals to the y electrodes 3c can be independently operated. Any region surrounded by the x electrodes 3b and the y electrodes 3c is a pixel, which is a minimum unit for driving the liquid crystal displays of the invention. At least one out of the TFT elements 7 and at least one out of the pixel electrodes 3d are fitted to each of the pixels. In the liquid crystal displays of the invention, the TFT elements 7 of the respective pixels can be worked by applying signal voltages successively to the x electrodes 3b and the y electrodes 3c.

Furthermore, the liquid crystal displays of the invention can be used as a color liquid crystal displays by forming a micro color filter in which TFT elements 7 are arranged in a matrix form between the common electrode 3a and the substrate 4a. Each of the constituent members of the liquid crystal displays of the invention, as described above, will be described in detail hereinafter.

1. Constituent Members of Liquid Crystal Displays (1) Light Orientation Films

The photo alignment films are each the following film: light the polarization of which is controlled is radiated onto a substrate coated with a polymer film to generate photo-excited reaction (decomposition, isomerization or dimerization) of the polymer, thereby giving an isotropy into the polymer film to orient liquid crystal molecules on this film.

The constituent material of the photo alignment film used in the invention is not limited to any especial kind if the material has an effect of generating photo-excited reaction by the irradiation thereof with light to orient the ferroelectric liquid crystal thereon (photoaligning). Such a material can be roughly classified into an optically isomerizable type, in which only the shape of the molecule thereof changes so that the orientation thereof can reversibly change, and a photoreactive type, in which the molecule itself thereof changes. In the invention, the constituent materials of the upper and lower photo alignment films are not limited to any especial material if the compositions of the materials are different from each other. Thus, it is permissible to combine a material of the photoreactive type with that of the optically isomerizable type, or use either of a material of the photoreactive type or that of the optically isomerizable type to make the compositions of the upper and lower photo alignment films different.

It is particularly preferred in the invention that the constituent material of one orientation film (first photo alignment film), out of two photo alignment films sandwiching a ferroelectric liquid crystal, is a photoreactive material which generates photoreaction to give anisotropy to the photo alignment film, and the constituent material of the other photo alignment film (second photo alignment film) is an optically isomerizable material comprising an optically isomerization-reactive compound which generates optical isomerization reaction to give anisotropy to the photo alignment film. The use of the combination of such materials makes it possible to make higher the power for controlling the orientation of the ferroelectric liquid crystal. The wavelength range of light which causes photo-excited reaction in the constituent materials of the photo alignment films is preferably within the wavelength range of ultraviolet rays, that is, the range of 10 to 400 nm, more preferably within the range of 250 to 380 nm. The following will describe the first photo alignment film and the second photo alignment film in more detail.

(First Photo Alignment Film)

As described above, the first photo alignment film used in the invention is preferably a photoreactive material which generates photoreaction to give anisotropy to the photo alignment film.

The photoreaction is not limited to any especial kind if the reaction can change the molecule itself by the irradiation with light to supply anisotropy to the photoaligning of the photo alignment film. Optical dimerization reaction and photolysis are more preferable since the supply of the anisotropy to the photo alignment film becomes easier. The optical dimerization reaction is a reaction that two molecules are polymerized by radical polymerization of their reactive sites oriented in the direction of polarization through the irradiation thereof with light. This reaction makes it possible to stabilize the orientation in the polarization direction to give anisotropy to the photo alignment film. On the other hand, the photolysis is a reaction which decomposes a molecule chain of polyimide or the like which is oriented in the direction of polarization by the irradiation thereof with light. This reaction makes it possible to give anisotropy to the photo alignment film in the state that the molecule chain oriented in the direction perpendicular to the polarization direction remains. Examples of the photoreactive material using the photolysis include a polyimide "RN 1199" manufactured by NISSAN CHEMICAL INDUSTRIES, LTD. It is more preferable in the invention to use, out of these photoreactive materials, materials which give anisotropy to the photo alignment film by the optical dimerization reaction since the materials are high in exposure sensitivity and the scope of material-selection is wide.

The photoreactive material using optical dimerization reaction is not limited to any especial kind if the material can give anisotropy to the photo alignment film by optical dimerization reaction. The material preferably comprises an optically dimerization-reactive compound having a radical-polymerizable functional group and dichroism that different absorptivities are exhibited in accordance with the polarization direction thereof since the orientation of the optically dimerization-reactive compound is stabilized and anisotropy can easily be given to the photo alignment film by radical-polymerizing its reactive sites oriented in the polarization direction.

Examples of the optically dimerization-reactive compound include dimerization-reactive polymers each having, as its side chain, at least one reactive site selected from cinnamic acid ester, coumalin, quinoline, a chalcone group and a cinnamoyl group.

Of these, the following is preferred as the optically dimerization-reactive compound having such properties: a dimerization-reactive polymer having, as its side chain, any one of cinnamic acid ester, coumalin and quinoline. This is because the compound is radical-polymerized in the state that the double bonds in the α, β-unsaturated ketone oriented in the polarization direction function as reactive sites, whereby anisotropy can easily be given to the photo alignment film.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment film. Conversely, if it is too large, the viscosity of the coating solution at the time of the formation of the photo alignment film is so high that a homogeneous coat film may not easily be formed.

As the dimerization-reactive polymer, a compound represented by the following formula (1) can be illustrated:

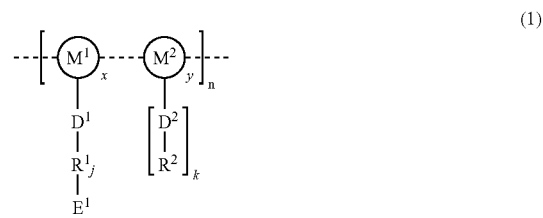

(1)

In the formula (1), $M^1$ and $M^2$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^2$ may be acrylonitrile, methacrylonitrile, methacrylate, methyl methacrylate, hydroxyalkyl acrylate or hydroxyalkyl methacrylate. x and y each represent the mole ratio of each of the monomer units when the units are polymerized into a copolymer, and are each a number satisfying: $0<x\leq1$, $0\leq y<1$, and $x+y=1$. n represents an integer of 4 to 30,000. $D^1$ and $D^2$ each represent a spacer unit.

$R^1$ is a group represented by $-A-(Z^1-B)_z-Z^2-$, and $R^2$ is a group represented by $-A-(Z^1-B)_z-Z^3-$, wherein A and B each independently represent a covalent single bond, pyridine-2, 5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, —CH₂—CH₂—, —CH₂O—, —OCH₂—, —CONR—, —RNCO—, —COO— or —OOC—, wherein R is a hydrogen atom or a lower alkyl group; $Z^3$ is a hydrogen atom, an alkyl or alkoxy which has 1 to 12 carbon atoms and may have a substituent, cyano, nitro or halogen; z is an integer of 0 to 4; $E^1$ represents an optically dimerization-reactive site, examples of which include cinnamic acid ester, coumalin, quinoline, a chalcone group and a cinnamoyl group; and j and k are each independently 0 or 1.

More preferable examples of this dimerization-reactive polymer include compounds represented by the following formulae:

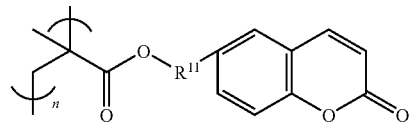

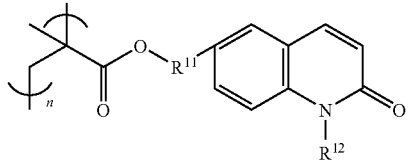

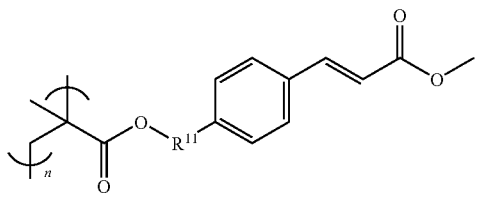

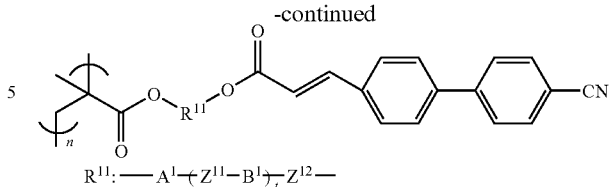

wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond; and t: an integer of 0 to 4.

$R^{12}$: a lower alkyl n: an integer of 4 to 30,000

Of the above-mentioned dimerization-reactive polymers, particularly preferable is at least one of compounds 1 to 4 represented by the following formulae:

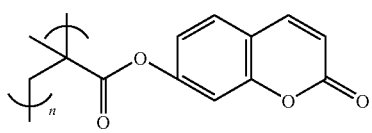

1

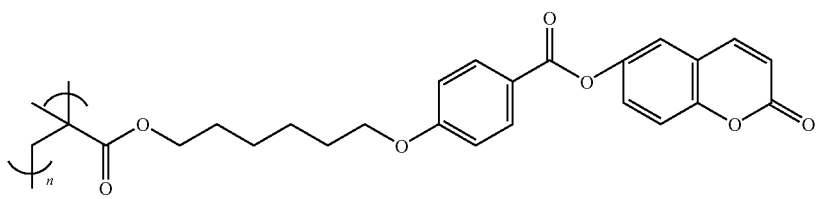

2

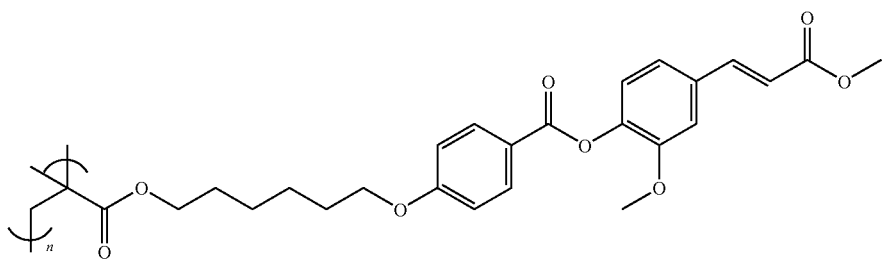

3

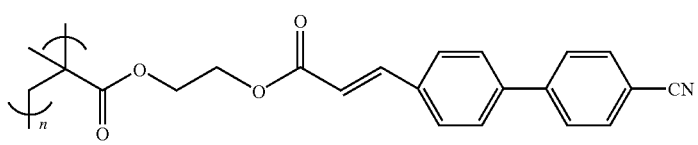

4

In the present invention, an optically dimerization-reactive site or substituent can be variously selected as the optically dimerization-reactive compound from the above-mentioned compounds in accordance with required properties. One kind of the optically dimerization-reactive compound may be used alone or a combination of two or more kinds thereof can be used.

The photoreactive material using optical dimerization 0reaction may contain additives besides the above-mentioned optically dimerization-reactive compound as long as the photoaligning of the photo alignment film is not hindered. Examples of the additives include a polymerization initiator and a polymerization inhibitor.

It is advisable to select the polymerization initiator or the polymerization inhibitor appropriately from generally-known compounds in accordance with the kind of the optically dimerization-reactive compound and then use the selected one. The added amount of the polymerization initiator or the polymerization inhibitor is preferably from 0.001 to 20% by weight, more preferably from 0.1 to 5% by weight of the optically dimerization-reactive compound. If the added amount of the polymerization initiator or the polymerization inhibitor is too small, the polymerization may not be initiated (or inhibited) Conversely, if the amount is too large, the reaction may be hindered.

The following will describe the optically orienting method. First, the face of an electrode-formed substrate which is to oppose to a liquid crystal layer is coated with a coating solution in which the above-mentioned constituent material of the light orientation film is diluted with an organic solvent, and then the solution is dried. In this case, the content of the optically dimerization-reactive compound in the coating solution is preferably from 0.05 to 10% by weight, more preferably from 0.2 to 2% by weight. If the content of optically dimerization-reactive compound is too small, an appropriate anisotropy is not easily given to the photo alignment film. Conversely, if the content is too large, the viscosity of the coating solution becomes so high that a homogeneous coat film is not easily formed.

The coating method which can be used is spin coating, roll coating, rod bar coating, spray coating, air knife coating, slot die coating, wire bar coating or the like.

The thickness of the polymer film obtained by the coating with the constituent material is preferably from 1 to 200 nm, more preferably from 3 to 100 nm. If the thickness of the polymer film is too small, a sufficient photoaligning may not be obtained. Conversely, if the thickness is too large, the orientation of the liquid crystal molecules may be disturbed and further costs therefor are not preferred.

The resultant polymer film causes photo-excited reaction by the irradiation thereof with light the polarization of which is controlled, whereby anisotropy can be given. The wavelength range of the radiated light should be appropriately selected in accordance with the constituent material of the used photo alignment film, and is preferably the range of ultraviolet ray wavelengths, that is, the range of 100 to 400 nm, more preferably the range of 250 to 380 nm.

The direction of the polarization is not especially limited if the direction makes it possible to generate the photo-excited reaction, and is preferably in the range of 0 to 450 oblique to the substrate face of the upper and lower photo alignment films, more preferably in the range of 20 to 45° oblique thereto since the orientation state of the ferroelectric liquid crystal can be made good.

(Second Photo Alignment Film)

The following will describe the second photo alignment film used in the present invention. As described above, the second photo alignment film used in the invention is preferably an optically isomerizable material comprising an optically isomerization-reactive compound which generates optical isomerization reaction to give anisotropy to the photo alignment film. The optical isomerization reaction means a phenomenon that a single compound is changed into some other isomer by the irradiation thereof with light. The use of such an optically isomerization-reactive material makes it possible to increase a stable isomer from plural isomers by the irradiation with light, whereby anisotropy can easily be given to the photo alignment film.

The optically isomerization-reactive compound is not limited to any especial kind if the compound is a material capable of giving anisotropy to the photo alignment film by optical isomerization reaction, and is preferably a compound which has dichroism that different absorptivities are exhibited in accordance with the polarization direction thereof and generates optical isomerization reaction by the irradiation thereof with light. By generating the isomerization of the reactive site oriented in the polarization direction of the optically isomerization-reactive compound having such properties, anisotropy can easily be given to the photo alignment film.

For the optically isomerization-reactive compound, the optical isomerization reaction is preferably the cis-trans isomerization reaction since any one of the cis-isomer and the trans-isomer increases by the irradiation thereof with light, whereby anisotropy can be given to the photo alignment film.

Examples of the optically isomerization-reactive compound used in the invention may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment film by the irradiation thereof with light and subsequently the monomer is polymerized, whereby the anisotropy can be made stable. Of such polymerizable monomers, preferable is an acrylate monomer or methacrylate monomer since the monomer gives anisotropy to the photo alignment film and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment film, based on the polymerization, becomes more stable.

Specific examples of such an optically isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the orientation of the ferroelectric liquid crystal is easily controlled.

The cis-trans isomerization-reactive skeleton(s) may have a substituent in order to make interaction thereof with the liquid crystal molecules higher. The substituent is not limited to any especial kind if the substituent can make the interaction with the liquid crystal molecules high and further does not hinder the orientation of the cis-trans isomerization-reactive skeleton(s). Examples thereof include a carboxyl group, a sodium sulfonate group, and a hydroxyl group. These skeleton structures can be appropriately selected in accordance with the kind of the used ferroelectric liquid crystal.

The optically isomerization-reactive compound may have a group containing many π electrons in the molecule, such as an aromatic hydrocarbon group, besides the cis-trans isomerization-reactive skeleton in order to make the interaction with the liquid crystal molecules higher. The cis-trans isomerization-reactive skeleton and the aromatic hydrocarbon group may be bonded to each other through a bonding group. The bonding group is not limited to any especial kind if the group can make the interaction with the liquid crystal molecules high. Examples thereof include —COO—, —OCO—, —O—, —C≡C—, —CH$_2$—CH$_2$—, —CH$_2$O—, and —OCH$_2$—.

In the case of using a polymerizable monomer as the optically isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment film becomes larger and this compound becomes particularly suitable for the control of the orientation of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

The side chain of the polymerizable monomer may have, as a spacer, an aliphatic hydrocarbon group such as an alkylene group so that the cis-trans isomerization-reactive skeleton can easily be oriented.

Of the above-mentioned optically isomerization-reactive compounds of monomolecular compounds and polymerizable monomers as described above, any compound having in the molecule thereof an azobenzene skeleton is preferable as the optically isomerization-reactive compound used in the present invention. This is because the azobenzene skeleton interacts highly with the liquid crystal molecules and is particularly suitable for the control of the orientation of the ferroelectric liquid crystal since the skeleton contains many π electrons.

When the azobenzene skeleton is irradiated with linearly polarized ultraviolet rays, the azobenzene skeleton of a trans isomer, in which its molecule long axis is orientated in the polarization direction, is changed to the cis isomer thereof.

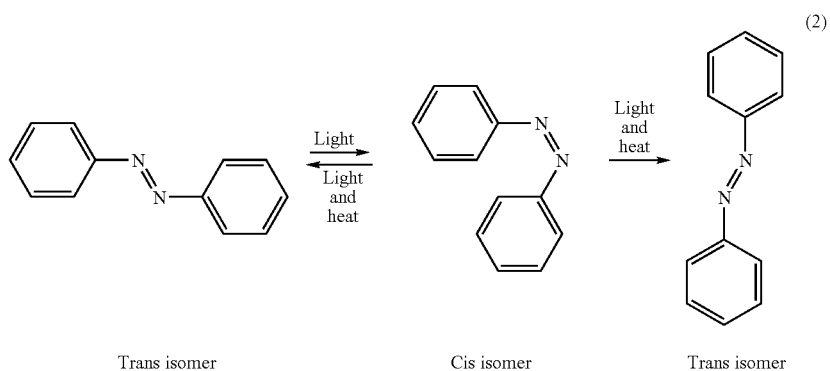

(2)

Trans isomer     Cis isomer     Trans isomer

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in the formula (2). Accordingly, when the azobenzene skeleton continues to absorb ultraviolet rays, the ratio of the trans isomer at the right side increases so that the average orientation direction of the azobenzene skeleton becomes perpendicular to the polarized ultraviolet ray direction. In the present invention, this phenomenon is used to make polarization directions of skeletons of azobenzene consistent with each other, thereby giving anisotropy to the photo alignment film to control the orientation of liquid crystal molecules on the film.

An example of a monomolecular compound out of the compounds each having in the molecule thereof an azobenzene skeleton used in the present invention may be a compound represented by the following formula:

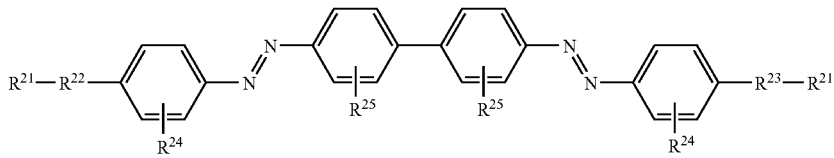

wherein $R^{21}$s each independently represent a hydroxy group; $R^{22}$ represents a linking group represented by $-(A^{21}-B^{21}-A^{21})_m-(D^{21})_n-$ and $R^{23}$ represents a linking group represented by $(D^{21})_n-(A^{21}-B^{21}-A^{21})_m-$, wherein $A^{21}$ represents a bivalent hydrocarbon group, $B^{21}$ represents —O—, —COO—, —OCO—, —CONH—, —NHCO—, —NHCOO— or —OCONH—, m represents an integer of 0 to 3, $D^{21}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; $R^{24}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and $R^{25}$s each independently represent a carboxy group, a sulfo group, a nitro group, an amino group or a hydroxy group provided that the carboxy group or the sulfo group may be combined with an alkali metal to form a salt.

Specific examples of the compound represented by the above-mentioned formula include the following compounds:

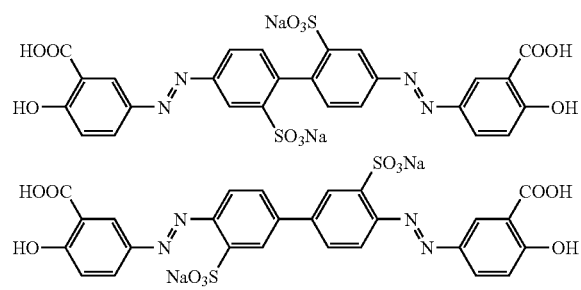

An example of the polymerizable monomer having in its side chain an azobenzene skeleton used in the present invention may be a compound represented by the following formula:

wherein $R^{31}$s each independently represent a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{32}$ represents a linking group represented by $-(A^{31}-B^{31}-A^{31})_m-(D^{31})_n-$ and $R^{33}$ represents a linking group represented by $(D^{31})_n-(A^{31}-B^{31}-A^{31})_m-$ wherein $A^{31}$ represents a bivalent hydrocarbon group, $B^{31}$ represents —O—, —COO—, —OCO—, —CONH—, —NHCO—, —NHCOO— or —OCONH—, m represents an integer of 0 to 3, $D^{31}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; $R^{34}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and $R^{35}$s each independently represent a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound:

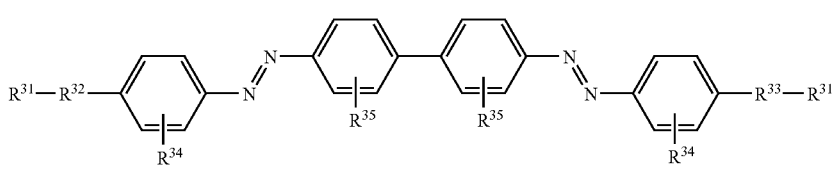

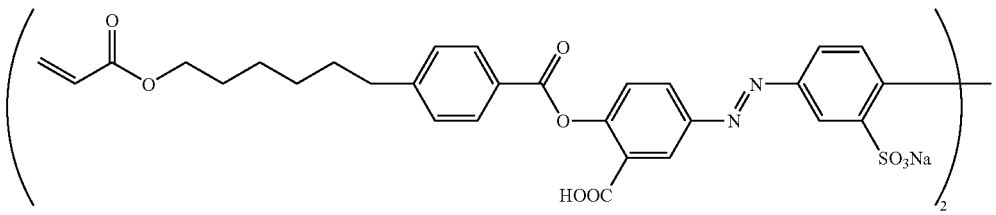

In the present invention, the cis-trans isomerization-reactive skeleton or substituent can be variously selected from the above-mentioned optically isomerization-reactive compounds in accordance with required properties. One kind of the optically isomerization-reactive compound may be used alone or a combination of two or more kinds thereof can be used.

Additives, besides the above-mentioned optically isomerization-reactive compound, maybe contained as constituent materials of the photo alignment film used in the present invention as long as the photoaligning of the photo alignment film is not hindered. In the case of using a polymerizable monomer as the optically isomerization-reactive compound, examples of the additives include a polymerization initiator and a polymerization inhibitor.

It is advisable to select the polymerization initiator or the polymerization inhibitor appropriately from generally-known compounds in accordance with the kind of the optically isomerization-reactive compound and then use the selected one. The added amount of the polymerization initiator or the polymerization inhibitor is preferably from 0.001 to 20%, more preferably from 0.1 to 5% by weight of the optically isomerization-reactive compound. If the added amount of the polymerization initiator or the polymerization inhibitor is too small, the polymerization may not be initiated (or inhibited) Conversely, if the amount is too large, the reaction may be hindered.

The method for the optically orienting treatment of the second photo alignment film can be performed in the same way as described about the first photo alignment film. In this case, the content of the optically isomerization-reactive compound in the coating solution is preferably from 0.05 to 10% by weight, more preferably from 0.2 to 5% by weight. In the second photo alignment film, the optically orienting treatment can also be conducted by radiating oblique non-polarized ultraviolet rays. The direction of the radiation of the light is not especially limited if the direction makes it possible to generate the photo-excited reaction, and is preferably in the range of 0 to 45° oblique to the substrate face of the upper and lower photo alignment films, more preferably in the range of 30 to 45° oblique thereto since the orientation state of the ferroelectric liquid crystal can be made good. Furthermore, in the case of using a polymerizable monomer as described above as the optically isomerization-reactive compound used in the invention, the optically orienting treatment is conducted in the same way as described about the first photo alignment film, and then the monomer is heated, thereby polymerizing the monomer. In this way, the anisotropy given to the photo alignment film can be made stable.

(2) Liquid Crystal Layer

The liquid crystal layer used in the invention is made by sandwiching a ferroelectric liquid crystal between the photo alignment films. The ferroelectric liquid crystal used in the liquid crystal layer is not limited to any especial kind if the ferroelectric liquid crystal exhibits a chiral smectic C phase (SmC*). The liquid crystal is preferably a ferroelectric liquid crystal material the phase series of which is a phase change from a chorestric phase (Ch) to a chiral smectic C phase (SmC*) via no smectic A phase (SmA).

The liquid crystal displays of the present invention are preferably driven by an active matrix system using thin film transistors (TFTs), and can be rendered a color liquid crystal displays by adopting a color filter system or a field sequential color system. In such a case, a material the phase of which changes from a Ch phase through a SmA phase to a SmC* phase can be used as the ferroelectric liquid crystal. A material the phase of which changes from a Ch phase to a SmC* phase via no SmA phase may be used. In the case of driving the liquid crystal displays of the invention, in particular, by a field sequential color system, it is preferable to use a liquid crystal material having mono-stability and undergoing phase transition via no SmA phase. The mono-stability herein means a nature that liquid crystal has only one stable state when no voltage is applied thereto, as described above. Particularly preferable is a ferroelectric liquid crystal undergoing half-V-shaped driving, in which liquid crystal molecules thereof work only when either one of positive and negative voltages is applied thereto since the liquid crystal makes it possible to lengthen the aperture time of a black and white shutter and realize bright color display.

The ferroelectric liquid crystal used in the invention is preferably one constituting a single phase. The word "constituting a single phase" means that a polymer network, as formed by the polymer stabilization method or the like, is not formed. Such use of the ferroelectric liquid crystal of a single phase produces an advantage that the production process becomes simple and the driving voltage can be made low.

The ferroelectric liquid crystal used in the invention may be, for example, "R2301" sold by Clariant(Japan) K.K.

The thickness of the liquid crystal layer made of the above-mentioned ferroelectric liquid crystal is preferably from 1.2 to 3.0 µm, more preferably from 1.3 to 2.5 µm, even more preferably from 1.4 to 2.0 µm. If the thickness of the liquid crystal layer is too small, the contrast may lower. Conversely, if the thickness is too large, the liquid crystal may not be oriented with ease.

As the method for forming the liquid crystal, a method which is generally used as a method for forming a liquid crystal cell can be used. For example, the liquid crystal layer can be formed, by making use of capillary effect to inject an isotropic liquid obtained by heating the above-mentioned ferroelectric liquid crystal into a liquid crystal cell, which is formed by forming electrodes beforehand on a substrate and arranging the above-mentioned photo alignment film, and then sealing the cell with an adhesive agent. The thickness of the liquid crystal layer can be adjusted with spacers such as beads.

(3) Substrate

The substrate used in the invention is not limited to any especial kind if the substrate can be generally used as a substrate of liquid crystal displays. Preferred examples thereof include glass plates and plastic plates. The surface roughness (RSM value) of the substrate is preferably 10 nm or less, more preferably 3 nm or less, even more preferably 1 nm or less. The surface roughness in the invention can be measured with an atomic force microscope (AFM).

(4) Electrodes

The electrodes used in the invention are not limited to any especial kind if the electrodes are electrodes which are generally used as electrodes of liquid crystal displays. At least one of the electrodes is preferably an electrode made of a transparent conductor. Preferred examples of the material of the transparent conductor include indium oxide, tin oxide, and indium tin oxide. In the case of rendering the liquid crystal displays of the invention liquid crystal displays of an active matrix system using TFT elements, one of upper and lower electrodes is rendered a full-face common electrode made of the transparent conductor and the other is rendered an electrode in which x electrodes and y electrodes are arranged in a matrix form and a TFT element and a pixel electrode are arranged in a region surrounded by each of the x electrodes and each of the y electrodes. In this case, the difference between concave and convex portions of an electrode layer made of the pixel electrodes, the TFT elements, the x electrodes and the y electrodes is preferably 0.2 μm or less. If the difference between the concave and convex portions of the electrode layer is more than 0.2 μm, orientation disturbance is easily generated.

About the above-mentioned electrodes, a transparent electroconductive film can be formed on the above-mentioned substrate by a vapor deposition method such as CVD, sputtering, or ion plating, and then this is patterned into a matrix form, whereby the x electrodes and the y electrodes can be obtained.

(5) Polarizing Plate

The polarizing plate used in the invention is not limited to any especial kind if the plate is a member for transmitting only a specific direction of wave motions of light. It is possible to use a member which is generally used as a polarizing plate for liquid crystal displays.

2. Process for Producing Liquid Crystal Displays

The liquid crystal displays of the invention can be produced by a process that is generally used as a process for producing liquid crystal displays. The following will describe a process for producing liquid crystal displays of an active matrix system using TFT elements as one example of the process for producing the liquid crystal displays of the invention. A transparent electroconductive film is first formed on a substrate by the above-mentioned vapor deposition method, so as to form a full-face common electrode. A transparent electroconductive film is patterned into a matrix form on another substrate to form x and y electrodes, and switching elements and pixel electrodes are set up.

Next, the two substrates, on which the electrodes are formed, are coated with photo alignment film materials having different compositions, respectively, and then subjected to optically orienting treatment to form photo alignment films. Beads are dispersed, as spacers, onto one of the thus-formed photo alignment films, and a sealing agent is applied to the periphery thereof. The two substrates are stuck onto each other so as to make the photo alignment films opposite to each other. The substrates are then thermally compressed. Capillary effect is used to inject a ferroelectric liquid crystal, in an isotropic liquid state, from an injecting port thereinto, and then the injecting port is sealed with an ultraviolet hardening resin or the like. Thereafter, the ferroelectric liquid crystal is slowly cooled, whereby the liquid crystal can be oriented. Polarizing plates are stuck onto the upper and the lower of the thus-obtained liquid crystal cell, whereby liquid crystal displays of the present invention can be yield.

3. Usage of Liquid Crystal Displays

The liquid crystal displays of the present invention can be used as color liquid crystal displays by adopting a color filter system or a field sequential color system. Since the color liquid crystal displays using the liquid crystal displays of the invention make it possible to orient ferroelectric liquid crystal without generating orientation defects such as double domains, it is possible to realize highly precise color display having a wide field angle and high-speed responsibility.

It is preferred to drive the liquid crystal displays of the invention by the field sequential color system out of these for the following reason. As described above, the field sequential color system is a system in which each pixel is subjected to time sharing, and thus high-speed responsibility is particularly necessary in order to obtain a good movie display characteristic.

In this case, it is preferred to use a liquid crystal material having mono-stability, in which a SmC* phase is exhibited from a Ch phase via no SmA phase, and it is particularly preferred to use a material undergoing half-V-shaped driving, in which liquid crystal molecules thereof work only when either one of positive and negative voltages is applied thereto. When such a material undergoing half-V-shaped driving is used, it is possible to make light leakage less when dark regions operate (when a black and white shutter is closed), and make the aperture time of the black and white shutter sufficiently long. This makes it possible to display respective colors switched with time more brightly to realize bright color liquid crystal displays.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The present invention will be described in more detail by way of the following examples. Compounds A to D represented by the following formulae were used as optically dimerization-reactive polymers and compounds i to v represented by the following formulae were used as optically isomerization-reactive compounds.

A
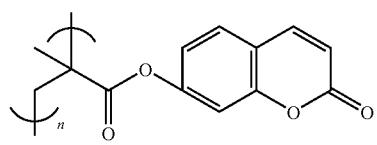
B
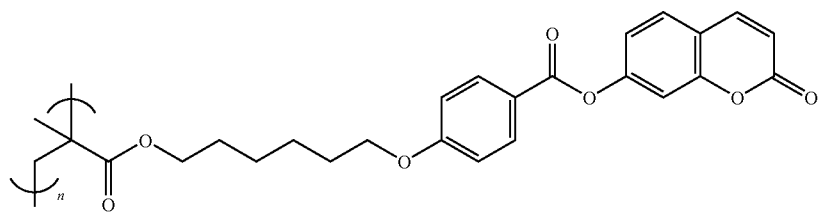
C
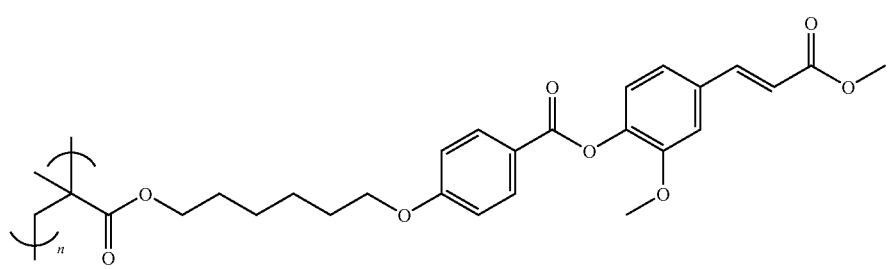
D
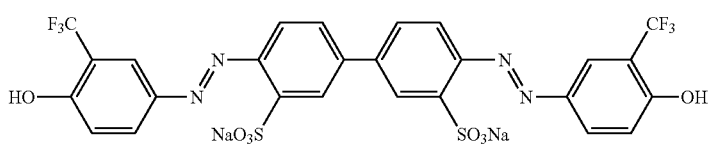
i
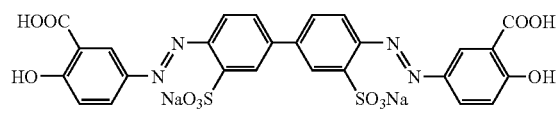
ii
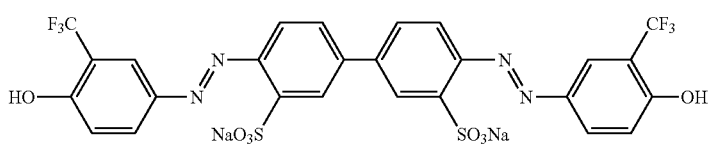
iii
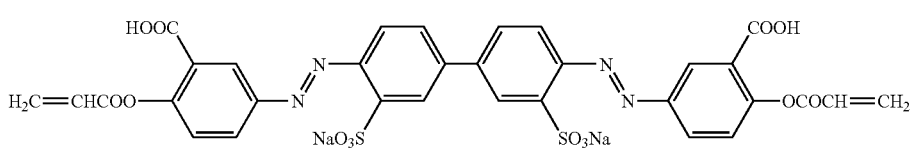
iv
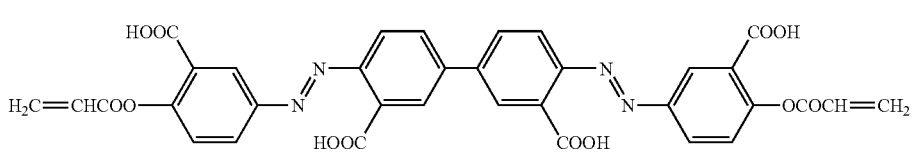
v
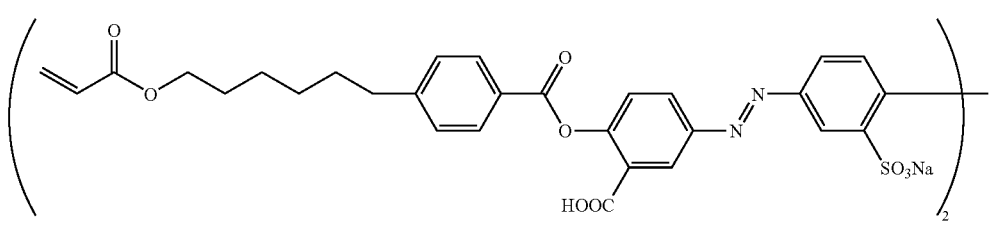

Example 1

Two glass substrates each coated with ITO were spin-coated with a 2% by weight solution of the compound A dissolved in cyclopentanone and a 1% by weight solution of the compound i dissolved in N-methyl-2-pyrrolidinone and 2-n-butoxyethanol (50:50% by weight), respectively, at a rotation number of 4000 rpm for 30 seconds. The substrate spin-coated with the solution of the compound A was dried at 180° C. in an oven for 10 minutes, and then polarized ultraviolet rays were radiated onto the substrate at 100 mJ/cm$^2$ from an angle 30° to the substrate face at 25° C. The substrate spin-coated with the solution of the compound i was dried at 100° C. in an oven for 1 minute, and then polarized ultraviolet rays were radiated onto the substrate at 1000 mJ/cm$^2$ and at 25° C. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, an "R2301" (manufactured by Clariant (Japan) K.K.) was used. The liquid crystal was attached to the upper of an injecting port thereof, and an oven was used to perform the injection of the liquid crystal at a temperature of 10 to 20° C. higher than the phase transition temperature between nematic and isotropic phases. The temperature was slowly returned to room temperature so that a mono-domain phase having no orientation defects was obtained.

Comparative Example 1

Two glass substrates coated with ITO were each spin-coated with a 2% by weight solution of the compound A dissolved in cyclopentanone at a rotation number of 4000 rpm for 30 seconds. Furthermore, they were dried, subjected to exposure treatment and fabricated into a cell, and then the liquid crystal was injected thereinto under the above-mentioned conditions. As a result, no mono-domain phase was obtained, and orientation defects such as double domains, zigzag defects and hairpin defects were generated.

Comparative Example 2

Two glass substrates coated with ITO were each spin-coated with a 2% by weight solution of the compound i dissolved in N-methyl-2-pyrrolidinone and 2-n-butoxyethanol (50:50% by weight) at a rotation number of 4000 rpm for 30 seconds. Furthermore, they were dried, subjected to exposure treatment and fabricated into a cell, and then the liquid crystal was injected thereinto under the above-mentioned conditions. As a result, no mono-domain phase was obtained, and orientation defects such as double domains, zigzag defects and hairpin defects were generated.

Example 2

The same way as in Example 1 was performed except that the compound B was used instead of the compound A in Example 1. As a result, a mono-domain phase having no orientation defects was obtained.

Example 3

The same way as in Example 1 was performed except that the compound C was used instead of the compound A in Example 1. As a result, a mono-domain phase having no orientation defects was obtained.

Example 4

The same way as in Example 1 was performed except that the compound D was used instead of the compound A in Example 1. As a result, a mono-domain phase having no orientation defects was obtained.

Example 5

The same way as in Example 1 was performed except that the compound ii was used instead of the compound i in Example 1. As a result, a mono-domain phase having no orientation defects was obtained.

Example 6

Two glass substrates each coated with ITO were spin-coated with a 2% by weight solution of the compound A dissolved in cyclopentanone and a 1% by weight solution of the compound iii dissolved in N-methyl-2-pyrrolidinone and 2-n-butoxyethanol (50:50% by weight), respectively, at a rotation number of 4000 rpm for 30 seconds. The substrate spin-coated with the solution of the compound A was dried at 180° C. in an oven for 10 minutes, and then polarized ultraviolet rays were radiated onto the substrate at 100 mJ/cm$^2$ from an angle 30° to the substrate face at 25° C. The substrate spin-coated with the solution of the compound iii was dried at 100° C. in an oven for 1 minute, and then polarized ultraviolet rays were radiated onto the substrate at 1000 mJ/cm$^2$ and at 25° C. Thereafter, the resultant was heated at 150° C. under the atmosphere of nitrogen for 1 hour. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, the "R2301" (manufactured by Clariant (Japan) K.K.) was used. The liquid crystal was attached to the upper of an injecting port thereof, and an oven was used to perform the injection of the liquid crystal at a temperature of 10 to 20° C. higher than the phase transition temperature between nematic and isotropic phases. The temperature was slowly returned to room temperature so that a mono-domain phase having no orientation defects was obtained.

Example 7

The same way as in Example 6 was performed except that the compound iv was used instead of the compound iii in Example 6. As a result, a mono-domain phase having no orientation defects was obtained.

Example 8

Two glass substrates each coated with ITO were spin-coated with a 2% by weight solution of the compound A dissolved in cyclopentanone and a 1% by weight solution of the compound v dissolved in N-methyl-2-pyrrolidinone and 2-n-butoxyethanol (50:50% by weight), respectively, at a rotation number of 4000 rpm for 30 seconds. The substrate spin-coated with the solution of the compound A was dried at 180° C. in an oven for 10 minutes, and then polarized ultraviolet rays were radiated onto the substrate at 100 mJ/cm$^2$ from an angle 30° to the substrate face at 25° C. The substrate spin-coated with the solution of the compound v was dried at 100° C. in an oven for 1 minute, and then polarized ultraviolet rays were radiated onto the substrate at 1000 mJ/cm² and at 25° C. Thereafter, the resultant was heated at 150° C. under the atmosphere of nitrogen for 1 hour. Spacers of 1.5 μm size were sprayed onto one of the substrates, and a sealing material was applied onto the other substrate with a seal disperser. Thereafter, the substrates were fabricated in parallel to the radiation direction of the polarized ultraviolet rays and in an anti-parallel state, and then thermally compressed. As the liquid crystal, the "R2301" (manufactured by Clariant (Japan) K.K.) was used. The liquid crystal was attached to the upper of an injecting port thereof, and an oven was used to perform the injection of the liquid crystal at a temperature of 10 to 20° C higher than the phase transition temperature between nematic and isotropic phases. The temperature was slowly returned to room temperature so that a mono-domain phase having no orientation defects was obtained.

Comparative Example 3

Two glass substrates coated with ITO were each spin-coated with a 2% by weight solution of the compound v dissolved in N-methyl-2-pyrrolidinone and 2-n-butoxyethanol (50:50% by weight) at a rotation number of 4000 rpm for 30 seconds. Furthermore, they were dried, subjected to exposure treatment and fabricated into a cell, and then the liquid crystal was injected thereinto under the above-mentioned conditions. As a result, no mono-domain phase was obtained, and orientation defects such as double domains, zigzag defects and hairpin defects were generated.

What is claimed is:

1. A liquid crystal display comprising a ferroelectric liquid crystal layer sandwiched between two substrates,
   wherein an electrode and a photo alignment film are each successively formed on inner sides of the substrates facing each other, a constituent material of a first photo alignment film out of the two photo alignment films is a photoreactive material which generates photoreaction to give anisotropy to the first photo alignment film, and a constituent of a second photo alignment film is an optically isomerizable material comprising an optically isomerization-reactive compound which generates an optical isomerization reaction to give anisotropy to the second photo alignment film;
   wherein the constituent material of the first photo alignment film has a different composition from the constituent material of the second photo alignment film;
   wherein a ferroelectric liquid crystal in the ferroelectric liquid crystal layer is a liquid crystal having no smectic A phase in a phase series thereof, exhibiting monostability and undergoing half V-shaped driving; and further wherein the ferroelectric liquid crystal forms monodomain alignment in the ferroelectric liquid crystal layer.

2. The liquid crystal display according to claim 1, wherein the photoreaction is an optical dimerization reaction or a photo decomposition reaction.

3. The liquid crystal display according to claim 1, wherein the photoreactive material comprises an optically dimerization-reactive compound having a radical-polymerizable functional group and dichroism that different absorptivities are exhibited in accordance with a polarization direction thereof.

4. The liquid crystal display according to claim 3, wherein the optically dimerization-reactive compound is a dimerization-reactive polymer containing, as its side chain, any one of cinnamic acid ester, coumarin, and quinoline.

5. The liquid crystal display according to claim 3, wherein the optically dimerization-reactive compound is at least one selected from dimerization-reactive polymers represented by the following formulae:

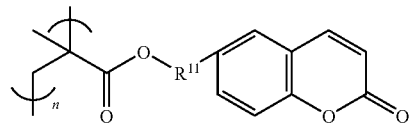

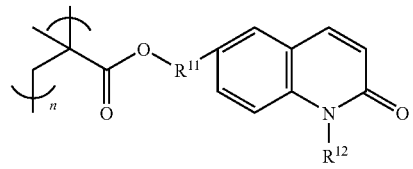

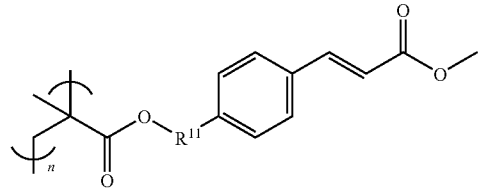

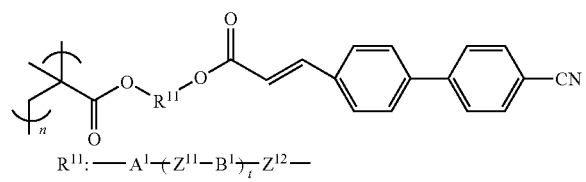

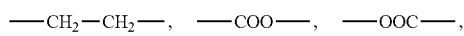

wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$:

—CH₂—CH₂—,    —COO—,    —OOC—, or a covalent single bond; and t: an integer of 0 to 4

$R^{12}$: a lower alkyl n: an integer of 4 to 30,000.

6. The liquid crystal display according to claim 1, wherein the optically isomerization-reactive compound is a compound which has dichroism that different absorptivities are exhibited in accordance with a polarization direction thereof and further generates the optical isomerization reaction by an irradiation thereof with light.

7. The liquid crystal display according to claim 1, wherein the optical isomerization reaction is a cis-trans isomerization reaction.

8. The liquid crystal display according to claim 1, wherein the optically isomerization-reactive compound is a compound having, in a molecule thereof, an azobenzene skeleton.

9. The liquid crystal display according to claim 1, wherein the optically isomerization-reactive compound is a polymerizable monomer having, as its side chain, an azobenzene skeleton.

10. The liquid crystal display according to claim 1, wherein the ferroelectric liquid crystal is a liquid crystal which constitutes a single phase.

11. The liquid crystal display according to claim 1, which is driven by an active matrix system using thin film transistors.

12. The liquid crystal display according to claim 1, which is driven by a field sequential color system.

* * * * *